United States Patent
Quijano et al.

(10) Patent No.: US 11,347,325 B2
(45) Date of Patent: May 31, 2022

(54) CONTROL AREAS ON MEDIA

(71) Applicant: HEWLETT-PACKARD DEVELOPMENT COMPANY, L.P., Houston, TX (US)

(72) Inventors: David Quijano, Ft. Collins, CO (US); Scott Rawlings, Ft. Collins, CO (US); Bruce E. Blaho, Ft. Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 873 days.

(21) Appl. No.: 16/077,076

(22) PCT Filed: Feb. 21, 2017

(86) PCT No.: PCT/US2017/018656
§ 371 (c)(1),
(2) Date: Aug. 10, 2018

(87) PCT Pub. No.: WO2018/156100
PCT Pub. Date: Aug. 30, 2018

(65) Prior Publication Data
US 2021/0200330 A1    Jul. 1, 2021

(51) Int. Cl.
*G06F 3/03* (2006.01)
(52) U.S. Cl.
CPC ................ *G06F 3/0304* (2013.01)
(58) Field of Classification Search
CPC .... G06F 3/0304; G06F 3/0354; G06F 3/0484; G06F 3/0488
See application file for complete search history.

(56) References Cited

U.S. PATENT DOCUMENTS

| | | | |
|---|---|---|---|
| 7,342,575 B1 * | 3/2008 | Hartwell | G06F 3/03545 345/179 |
| 7,532,366 B1 | 5/2009 | Yang et al. | |
| 8,970,540 B1 | 3/2015 | Hebenstreit et al. | |
| 9,335,838 B2 | 5/2016 | Black et al. | |

(Continued)

FOREIGN PATENT DOCUMENTS

| | | |
|---|---|---|
| AU | 2013276996 A1 | 1/2014 |
| WO | 2005076115 A2 | 8/2005 |

(Continued)

OTHER PUBLICATIONS

"Livescribe 3 Smartpen Review", IT PRO, Retrieved from Internet—http://www.itpro.co.uk/mobile/21038/livescribe-3-smartpen-review, 2016, 7 Pages.

(Continued)

*Primary Examiner* — Patrick N Edouard
*Assistant Examiner* — Joseph P Fox
(74) *Attorney, Agent, or Firm* — Trop Pruner & Hu PC

(57) ABSTRACT

In some examples, a controller is to track markings of an input element in a content area defined on a medium without electronic input capability, and track an input made with the input element in a file handling control area defined on the medium, the input made with the pen in the file handling control area comprising information relating to a file and is to cause saving of a representation of the markings made in the content area according to the information relating to the file.

18 Claims, 4 Drawing Sheets

(56) References Cited

U.S. PATENT DOCUMENTS

2009/0161959 A1* 6/2009 Markiewicz ........... G06K 9/222
                                                        382/187

FOREIGN PATENT DOCUMENTS

WO      2013000689  A1      1/2013
WO      2016068925  A1      5/2016

OTHER PUBLICATIONS

"Smart Writing Set", Moleskine, Retrieved from Internet—http://www.moleskine.com/en/news/smartwritingset, 2016, 3 Pages.
"Livescribe Smartpen User Guide", Version 2.5, Retrieved from Internet—https://www.livescribe.com/en-us/media/pdf/support/SmartpenUserManual.pdf, 2010, 145 Pages.
"This Smart Paper Notepad Saves Everything You Write on It", Tech ProOn, Retrieved from Internet—https://tech-pr0n.gadgethacks.com/news/smart-paper-notepad-saves-everything-you-write-0170330/, 2016, 5 Pages.

* cited by examiner

CONTROL AREAS ON MEDIA

BACKGROUND

A user can make markings on a medium such as a paper, where the markings can include drawings or text written by the user on the paper. To capture such user-entered markings on the paper, a scanner can be used to scan the paper with the markings, which can electronically capture the markings for storage or communication to a target.

BRIEF DESCRIPTION OF THE DRAWINGS

Some implementations of the present disclosure are described with respect to the following figures.

Figure 1A:
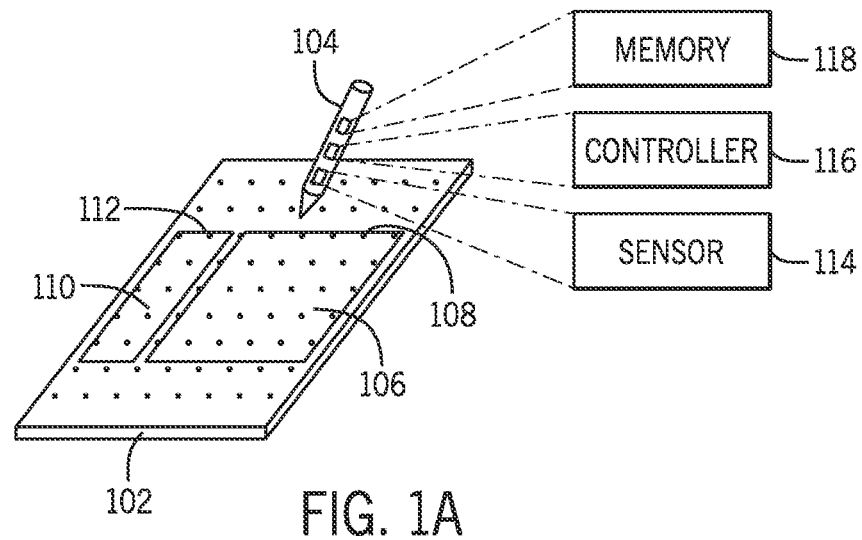
FIGS. 1A-1C illustrate examples of arrangements in which markings made by users on passive media can be captured.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Traditionally, users can write text, make drawings, or input other markings onto a medium that is without electronic input capability. A medium without electronic input capability is a medium that does not have the capability to electronically detect input made based on touch or proximity to the medium. For example, the medium can be a piece of paper, a transparency foil, or any other substrate on which users can make markings using a pencil, an ink pen, a marker, or any other writing instrument that is able to make a physical marking on the substrate. A medium without electronic input capability is contrasted to an electronic input device, such as a touch-sensitive display device, a touchpad, or a digital pad that has sensing circuitry (e.g., capacitive-based sensors, resistive-based sensors, optical sensors, etc.) to sense touch input made with a user's finger or a digital pen. A medium without sensing circuitry to detect touch input or other user-provided input can also be referred to as a "passive medium," which is a medium in which markings can be made onto the medium but the medium itself is unable to electronically capture the markings.

A pen can refer to an instrument that is used to enter markings onto a surface of the medium. The markings can be invisible or visible to a user. A marking that is invisible to a user can either be made with ink that is outside the visible light spectrum, or can be a virtual marking that corresponds to the movement (gesture) of the pen but which does not actually make any physical marking on the medium.

A digital pen is a pen that includes a controller, a sensor, and a memory, where the controller can use measurements of the sensor to capture strokes of the digital pen on a medium, and to store information of the strokes in the memory of the digital pen. A "controller" can refer to a hardware processing circuit, such as any or some combination of the following: a microprocessor, a core of a multi-core microprocessor, a microcontroller, a programmable integrated circuit device, a programmable gate array, or any other type of hardware processing circuit. Alternatively, a controller can refer to a combination of a hardware processing circuit and machine-readable instructions executable on the hardware processing circuit.

Although digital pens can be used to capture gestures made by users on a medium, the medium itself remains devoid of any control features. For example, once a user makes markings on the medium with a digital pen that are captured electronically, such as by a computer, the user would then have to go to the computer to perform control actions with respect to the captured markings, which can be inconvenient.

In the ensuing discussion, reference is made to using a pen to make inputs with respect to a medium. More generally, an input element can be used to make inputs with respect to a medium, where an input element can refer to a pen (either a digital pen or a traditional writing instrument such as an ink pen, a pencil, a marker, etc.), a user's finger, or any other element that can be used to make a marking (either a physical marking or a virtual marking) on the medium.

In accordance with some implementations of the present disclosure, a medium without electronic input capability can include multiple defined areas on the medium, where a first area defined on the medium can include a content area to accept markings made with an input element by a user, and a second area defined on the medium can include a control area in which a user-input selection can be made using the input element to perform a control action with respect to the markings made in the content area.

In some examples, a control area on a medium can include a file handling control area in which an input can be made with an input element, where the input in the file handling control area includes information relating to a file and is to cause saving of a representation of the markings made in the content area according to the information relating to the file. As examples, the information relating to a file can include a name of the file, a type of the file, a location of the file, or any other information associated with the file. As used here, a "file" can refer to any electronic container that is able to store information. For example, a file can be a file that is defined by a file system that provides for a hierarchical arrangement of files and directories. In other examples, a file can include any other type of object in which information can be stored, and where the object can be uniquely identifiable.

In further examples, the control area on the medium can include a layer control area to allow for user selection of any one of multiple layers, so that markings in the content area can be applied to the selected layer.

FIG. 1A shows an example arrangement that includes a passive medium 102 and a digital pen 104 that can be used to make markings in a content area 106 defined on the medium 102. The content area 106 can be visibly defined using a boundary 108 that is visible to a user. Alternatively, the content area 106 is an area on the medium 102 that is not visibly identified to the user. A control area 110 is also defined on the medium 102, where the control area 110 can be defined by a boundary 112 that can be visible to a user, or alternatively, the control area 110 can be without a boundary that is visible to a user. The control area 110 can include a file handling control area or a layer control area.

The medium 102 is also provided with a pattern of location information that can be detected by the digital pen 104 for use in determining where the digital pen 104 is relative to the medium 102. In some examples, the pattern of location information can include a pattern of dots that can be detected by a sensor 114 in the digital pen 104. The pattern of dots can be printed onto the medium 102, and can be either visible or invisible to a user. For example, the pattern of dots can be printed with ink in the visible wavelength spectrum or outside the visible wavelength spectrum.

The pattern of dots on the medium 102 can encode coordinates on the medium 102. The coordinates can be indicated based on different arrangements of dots in different parts of the medium 102. In other examples, instead of using a pattern of dots, other patterns of location information (e.g., barcodes, text or numbers, etc.) can be provided on the medium 102. When the digital pen 104 is located over different parts of the medium 102, different location information is captured to allow the position of the digital pen 104 to be derived.

The digital pen 104 can include various electronic components, including the sensor 114, a controller 116, and a memory 118. The sensor 114 can be used to capture markings or selections made by a user on the medium 102 with the digital pen 104. The markings made by the digital pen 104 in the content area 106 can include drawings, text, or other markings, and the markings can be made with visible ink or invisible ink, or alternatively, the markings are virtual markings where no physical marking is actually made in the content area 106, but the gestures made by the user are captured to determine the markings that are being virtually made by the user using the digital pen 104. As a user moves the digital pen 104 in the content area 106, the sensor 114 can sense the gesture movement, and the controller 116 is able to capture the marking corresponding to the gesture movement.

A control selection made in the control area 110 can include text or other marking made by the user with the digital pen 104 in the control area 110, or alternatively, a selection can include the selection of a specific position in the control area 110, such as a position relating to a control icon or control text printed in the control area 110. For example, if a control icon or a control text (more generally referred to as a "control indication") is printed in the control area 110, a control selection can include the digital pen 104 selecting the control indication in the control area 110. The selection of the control indication can include touching the control indication for greater than some specified time duration, or alternatively, the selection of the control indication can include circling the control indication or crossing through control indication with the digital pen 104.

The controller 116 can receive data from the sensor 114, where the data can include data representing captured location information of the pattern of location information. In some examples, the controller 116 can process the captured data from the sensor 114, and the controller 116 is able to determine whether the captured data represents a marking made in the content area 106 or a selection made in the control area 110. If the controller 116 detects a marking made in the content area 106, the controller 116 can store the captured marking in the memory 118. If the controller 116 detects a selection made in the control area 110, the controller 116 can perform a control action in response to the selection made in the control area 110.

In other examples, instead of performing processing of the captured data from the sensor 114 by the controller 116, the controller 116 can store the captured data along with coordinates associated with the captured data into the memory 116, and can communicate the captured data along with the coordinate information to a controller (e.g., a computer) that is separate from the digital pen 104. The digital pen 104 can communicate with the separate controller over a wireless medium or a wired medium. The separate controller can then perform the processing of the captured data to determine whether the captured data includes a marking made in the content area 106 or a control selection made in the control area 110.

The memory 110 can include either a volatile memory or a non-volatile memory. A volatile memory can include a dynamic random access memory (DRAM), a static random access memory (SRAM), or other memory that loses its stored content when power is removed from the memory. A non-volatile memory can include a flash memory or other type of memory that does not lose its stored content in response to removal of power from the memory.

Figure 1B:
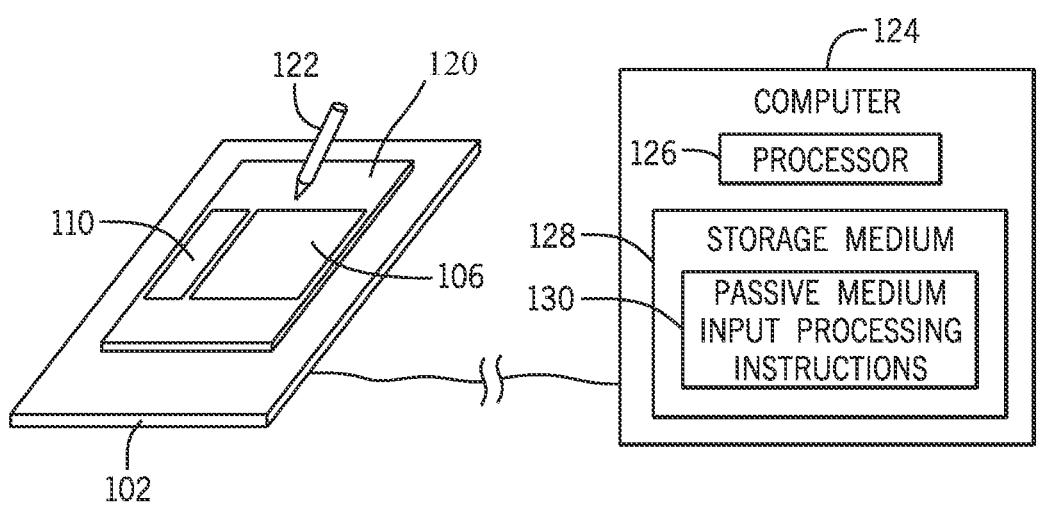

FIG. 1B shows another different example arrangement including the passive medium 102 that has the content area 106 and the control area 110. In the example of FIG. 1B, the medium 102 is not provided with a pattern of location information. Instead, the medium 102 in FIG. 1B is provided on a digital support structure 120 that has sensing circuitry to sense a position of a pen 122, and gestures made with the pen 122 on the medium 102. The digital support structure 120 can include a digital board or any other type of support structure. The pen 122 can include a digital pen or a non-digital pen such as a traditional writing instrument or any other instrument that can be used to make either physical or virtual markings or selections on the medium 102. Alternatively, a different input element, such as a user's finger, can be used in the arrangement of FIG. 1B to make markings or selections on the medium 102.

If the pen 122 is a digital pen, then the pen 122 can include an emitter (e.g., an optical emitter, a radio frequency emitter, etc.) to emit signals that can be detected by the sensing circuitry of the digital support structure 120. If the pen 122 is a non-digital pen or other input element, then the sensing circuitry 120 is able to detect the pen 122 or other input element when it makes contact with the medium 102. For example, in the latter case, the sensing circuitry of the digital support structure 120 can include capacitive-based sensors, resistive-based sensors, or other types of sensors to sense strokes of the pen 122 or other input element.

In the examples according to FIG. 1B, the sensed positions and markings made using the pen 122 on the medium 102 can be communicated by the digital support structure 120 to a computer 124. The communication can include a wireless communication or a wired communication.

The computer 124 includes a processor 126 and a storage medium 128 that stores passive medium input processing instructions 130 that are executable on the processor 126 to process inputs made with the pen 122 on the medium 102, as detected by the digital support structure 120. The passive medium input processing instructions 130 can detect markings made in the content area 106, and control selections made in the control area 110, and the passive medium input processing instructions 130 can perform the requested control actions with respect to the markings made in the content area 106. In other examples, instead of using the computer 124, the digital support structure 120 can include a controller that can perform tasks similar to the tasks of the passive medium input processing instructions 130.

The computer 124 can be considered a controller in the arrangement shown in FIG. 1B.

More generally, instead of using the digital support structure 120 on which is placed the medium 102, an electronic layer can be placed over or under the medium 102, where the electronic layer includes sensing circuitry to sense a position of the pen 122 or other input element relative to the medium 102.

Figure 1C:
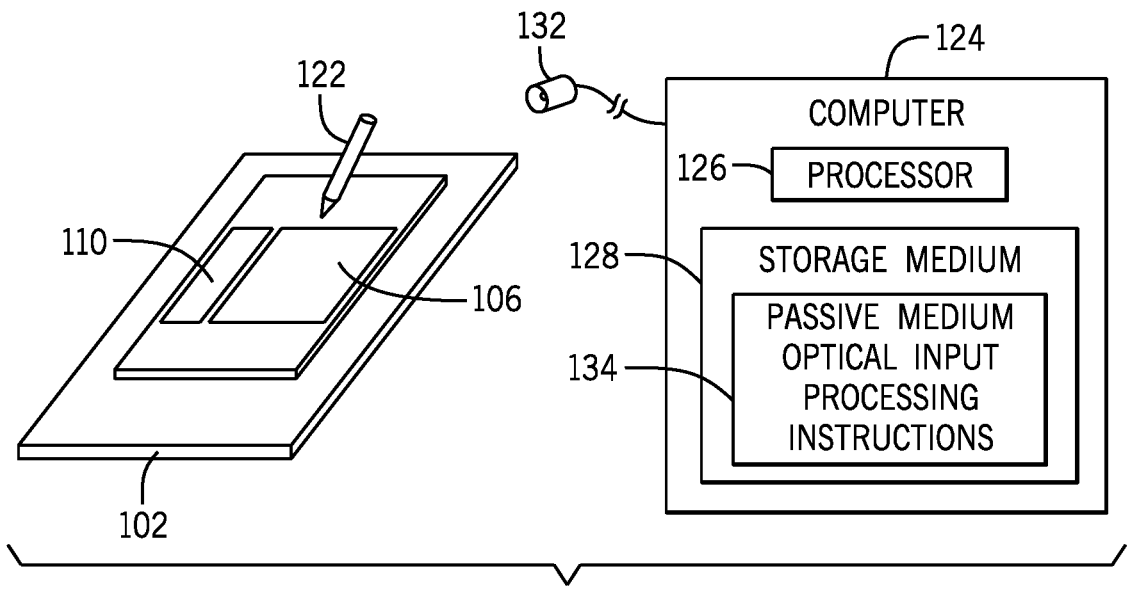

FIG. 1C shows another example arrangement that includes the passive medium 102 with the content area 106 and the control area 110. In FIG. 1C, a pen 122 (digital pen or non-digital pen) can be used to make inputs in the content area 106 and the control area 110. Alternatively, instead of the pen 122, a different input element (such as a user's finger) can be used to make an input on the medium 102. In addition, FIG. 1C shows a camera 132 that can be used to capture an image of the passive medium 102 and the pen 122. The camera 130 is in communication with the computer 124 shown in FIG. 1C, where the communication can include a wired communication or a wireless communication.

In the example of FIG. 1C, passive medium optical input processing instructions 134 are executable on the processor 126 of the computer 124 to process image data captured by the camera 132, where the image data includes an image of the passive medium 102 and the pen 122. The captured image can include a still image or images of a video. The passive medium optical input processing instructions 134 are executable on the processor 126 to process the image data to determine a relative position of the pen 122 with respect to the passive medium 102, and to determine a gesture made by the pen 122 in either the content area 106 or the control area 110 of the passive medium 102. Based on such processing, the passive medium optical input processing instructions 134 are able to detect markings made in the content area 106 and control selections made in the control area 110 and can perform the corresponding control actions with respect to the captured markings.

The control area 110 and the content area 106 (or more specifically, the boundaries of the control area 110 and the content area 106) can be pre-printed onto the medium 102, or alternatively, can be printed onto the medium 102 on demand.

In some examples, multiple users collaborating on the same document can print the document at the disparate locations of the users. Each respective user of the multiple users can print a copy of the document onto the medium (102), and the respective user can mark up the same document and each user's markups can be tracked. For example, assuming a corresponding digital pen is used by each respective user, a unique identifier that is assigned to the corresponding digital pen can be used to indicate which user made a specific markup (or specific markups). In examples where multiple layers can be defined, different layers can be associated with the different users, and the unique identifiers of the digital pens of the different users can be associated with respective different layers.

Figure 2:
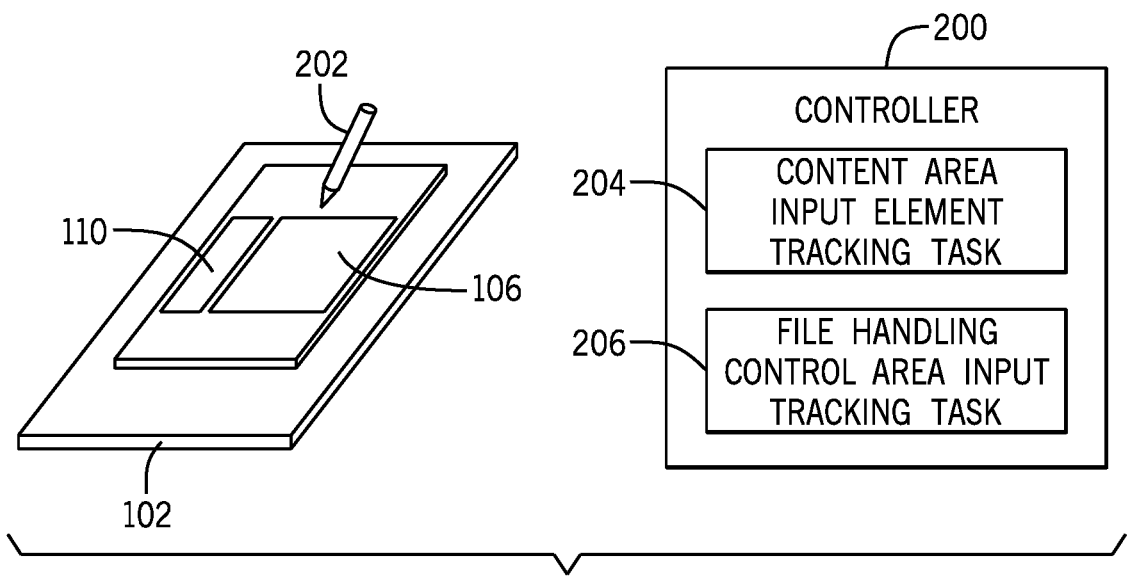
FIG. 2 is a block diagram of an example arrangement that uses a controller to capture markings made on a passive medium, according to some examples.

FIG. 2 shows an example arrangement that includes a controller 200 that is able to perform tasks with respect to inputs made by an input element 202 relative to the passive medium 102 that includes the content area 106 and the control area 110. In the example of FIG. 2, it is assumed that the control area 110 is a file handling control area. The input element 202 can include a digital pen, a non-digital pen, or a user's finger, as examples. The positions of the input element 202 relative to the passive medium 102, and gestures made by the input element 202 can be captured using any of the sensing mechanisms depicted in FIGS. 1A-1C, as examples.

The controller 200 can perform a content area input element tracking task 204 that tracks markings of the input element 202 in the content area 106 defined on the medium 102. The controller 200 further performs a file handling control area input tracking task 206 that tracks an input made with the pen 202 in the file handling control area 110, where the input that is made in the file handling control area includes information relating to a file and is to cause saving of a representation of the markings made in the content area 106 according to the information relating to the file.

Figure 3:
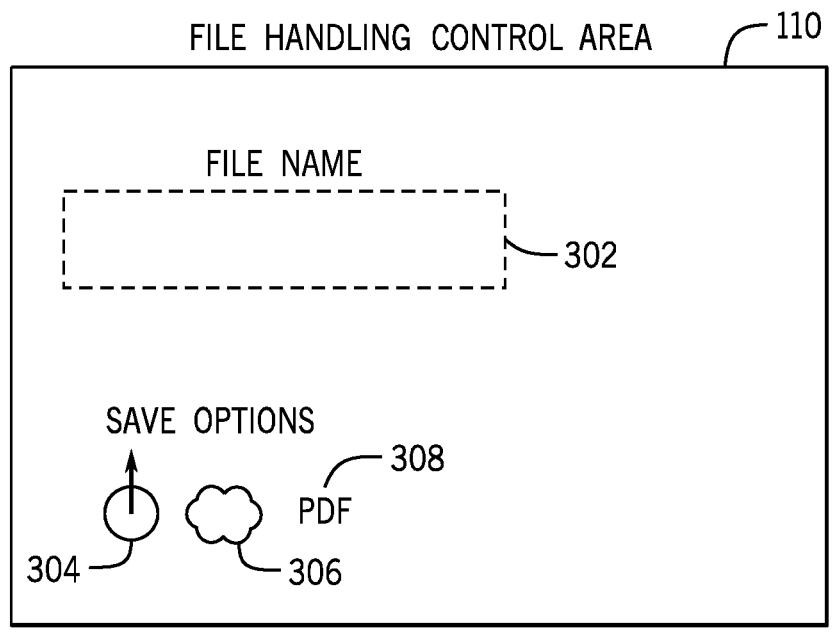
FIG. 3 is a block diagram of a file handling control area according to some examples.

An example of the file handling control area 110 is shown in FIG. 3. In FIG. 3, the file handling control area 110 includes a file name entry area 302, where a user can use the input element 202 to write a name of a file (file name) into the file name entry area 302. The file handling control area 110 also includes several control indications that are selectable by a user using the input device 202. A first control indication 304 when tapped by the input device or otherwise selected by the input device (e.g., such as by drawing a circle around the control indication 304, crossed through using the input device, and so forth), provides an indication that the captured markings in the content area 106 are to be uploaded to a digital pen. A control indication 306 when selected indicates that the captured markings in the content area 106 are to be uploaded to a cloud or other storage location. A control indication 308 when selected indicates that the markings are to be stored in a Portable Document Format (PDF) document.

More generally, information relating to a file that can be entered into the file handling control area 110 can include a characteristic of the file selected from among a file name, a type of the file (e.g., a PDF file, a word processing file, a spreadsheet file, a drawing file, etc.), and/or a location of the file (e.g., a digital pen, a cloud, a network, etc.). In an example, the control indications may identify locations in which to save files. A location of the file may include a device on which to save the file (e.g., the digital pen, the cloud, the network, etc.), a directory in which to save the file (e.g., commonly used directories, user-specified directories, etc.), both a device and a directory, and so forth.

The file may be saved when a control indication of the location is selected (e.g., control indication 304, 306, or 308) regardless of what additional information has been specified. In an example, the file may be saved when a minimum set of information has been specified, such as a file name and a location. The file may be saved when any information is entered. The file may be updated as additional information is received. For example, the file may be saved in a default location and as a default type when the file name is entered. It can be moved or the type can be changed as more information is entered. Similarly, a default name may be assigned if a control action other than a file name is selected. The default name may be replaced if a file name is later entered. Saving the file when any information is entered may reduce the risk of the user accidentally not saving the file.

Although a specific arrangement of the file handling control area 110 is shown in FIG. 3, it is noted that in other examples, the file handling control area 110 can have other arrangements.

In some examples, a user or a program can control (such as with a computer) what control elements are to be included in a control area (such as the control area 110). Based on the control elements the user or program has selected for inclusion in the control area 110, a copy of the medium 102 can be printed with the control area 110 containing the control elements that have been selected for inclusion in the control area 110. For example, a user may select control boxes or icons representing common file types, particular directories, etc., for inclusion in the control area 110. Similarly, the user may remove control boxes or icons representing file types or storage devices that the user does not use or that are not available. Other types of control elements can be selected by a user or program for inclusion in the control area 110 in other examples.

Figure 4:
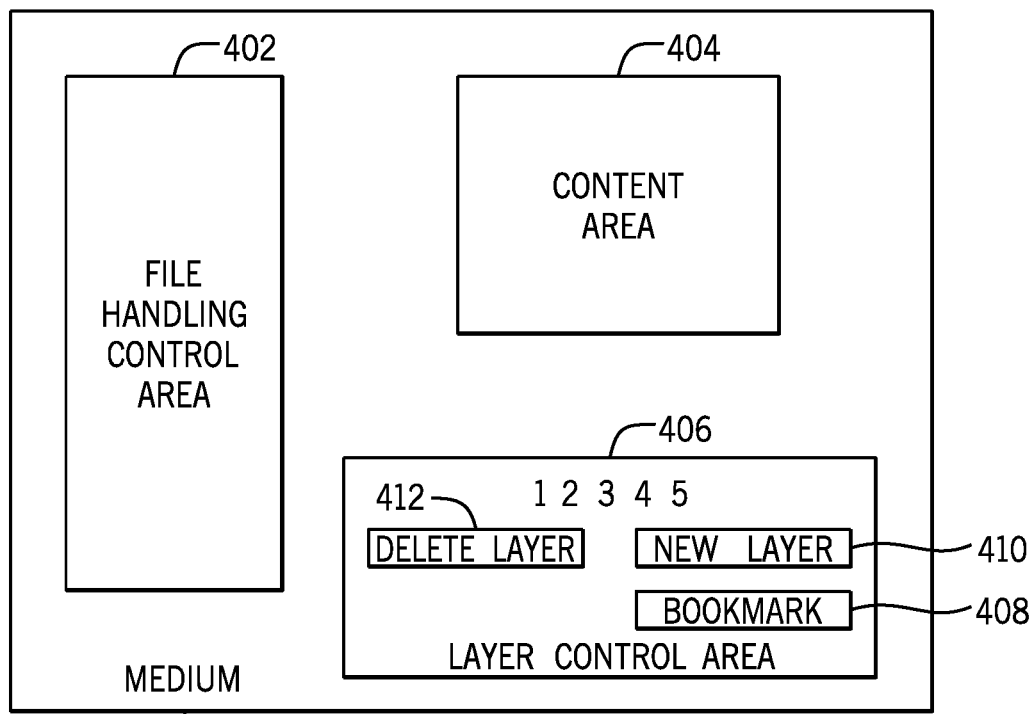
FIG. 4 is a block diagram of a passive medium including a file handling control area, a content area, and a layer control area, according to further examples.

FIG. 4 is a block diagram of an example of a passive medium 400 that includes a file handling control area 402 (similar to the file handling control area shown in FIG. 3, for example), a content area 404, and a layer control area 406. In other examples, the file handling control area 402 can be omitted from the medium 400.

The layer control area 406 includes layer indications (numbers 1, 2, 3, 4, and 5 in the example of FIG. 4) that are used to select a layer from among multiple layers (e.g., layer 1, layer 2, layer 3, layer 4, and layer 5) that correspond to the layer indications. For example, selection of the number 1 in the layer control area 406 is a selection of layer 1, selection of the number 2 in the layer control area 406 is a selection of layer 2, and so forth. Selecting a given layer indication can include touching the given layer indication with an input element (e.g., tapping the given layer indication or touching the given layer indication for greater than a specified time duration), circling the given layer indication, crossing through the given layer indication, and so forth.

A "layer" can refer to a logical representation of the medium 102 in which markings can be made in the layer. Although there is just one physical medium (i.e., the medium 102), there can be multiple logical layers defined with respect to the physical medium.

More generally, to select a layer, an input element action relative to a given layer indication (of multiple layer indications on the medium 102) is detected, where the detected input element action relative to the given layer indication selects a given layer of the multiple different layers that correspond to respective layer indications. Once the given layer is selected, markings in the content area 404 are made with respect to the given layer. When a user is finished with the given layer, the markings made for the given layer can be saved and retrieved later. Additionally, the user (or a different user) at a later time can select another layer to enter markings for the other layer.

Examples where layers can be used include a trace mode, where a layer can be defined to accept markings that trace over markings previously made on the medium 102 or another layer. For example, the markings on the medium 102 can include a drawing, and a layer can be selected to accept input markings made using an input element to trace over the drawing, such as to make changes to the drawing. The input markings made in the selected layer can be saved electronically, and can be combined with a stored representation of the drawing on the medium 102 to present (e.g., display, communicate, etc.) the marked up drawing that includes the original drawing and the markings that indicate changes to the drawing.

As another example, the markings on the medium 102 can include text, and a layer can be selected to accept input markings to make edits to the text.

Multiple layers can be defined to accept respective successive markings that indicate changes to previous versions of the content made on the medium 102 and/or another layer(s).

In other examples, multiple layers can be used to produce story boards for in a movie production. Story boards can include successive images of a scene in the movie, for example, where the successive images include common features with some changes (e.g., movement of a character, movement of a vehicle, etc.). The multiple layers can represent the story boards.

In some examples, the layer control area 406 can also include a bookmark indication 408 that is selectable using an input element to bookmark a layer, which identifies the layer as one which a user may wish to retrieve at a later time. A bookmark representation of the bookmarked layer can be stored and presented (e.g., displayed) on a display device of an electronic device associated with the user. The user can select the bookmark representation to retrieve the bookmarked layer at a later time.

In further examples, the layer control area 406 can also include a new layer indication 410 that is selectable using an input element to cause creation of a new layer. Creating a new layer can cause a new layer indication (e.g., the number 6) to be added to the layer control area 406. Initially, the new layer indication to be added to the layer control area 406 can be stored by a system (e.g., a digital pen or a computer). When another copy of the medium 400 is next printed, either by the same user who has been working on the medium 400 or by another user, the new layer indication would be included in the layer control area 406 of the newly printed medium 400.

In additional examples, the layer control area 406 can include a delete layer indication 412 which when selected using an input element causes deletion of a currently selected layer. The system processing the delete layer indication 412 can store the indication so that when another copy of the medium 400 is next printed, the deleted layer would no longer appear in the layer control area 406. Alternatively, instead of using the delete layer indication 412, a user can use the input element to cross through one of the layer indications (1-5) to cause deletion of the layer. Deleting a layer can include deleting markings captured for the deleted layer.

Figure 5:
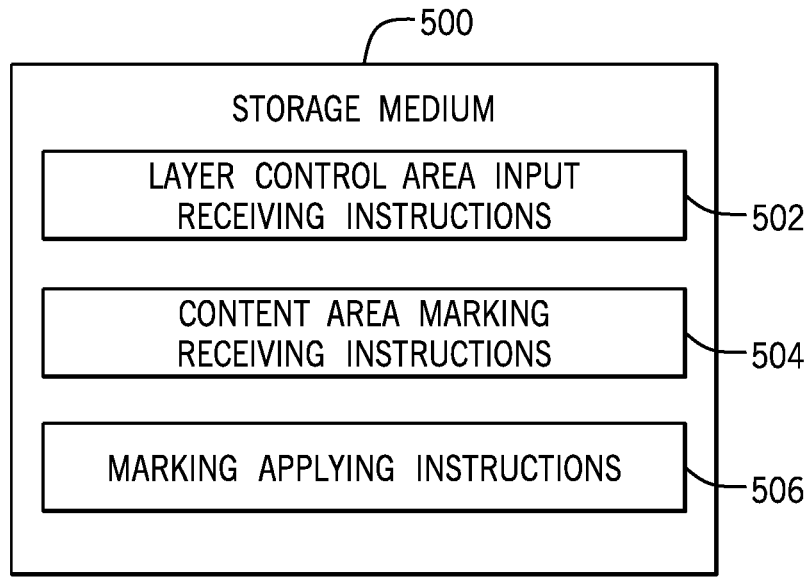
FIG. 5 is a block diagram of a storage medium storing machine-readable instructions according to some examples.

FIG. 5 shows a non-transitory machine-readable storage medium 500 storing machine-readable instructions that upon execution cause a system to perform various tasks. The machine-readable instructions include layer control area input receiving instructions 502 to receive input information regarding an input made with respect to a layer control area (e.g., 406 in FIG. 4) defined on a passive medium, where the input made with respect to the layer control area selects a first layer of multiple layers. The machine-readable instructions further include content area marking receiving instructions 504 to receive information of markings made in a content area (e.g., 404 in FIG. 4) defined on the medium.

The machine-readable instructions further include marking applying instructions 506 to apply the markings made in the content area to the first layer in response to the input information.

Figure 6:
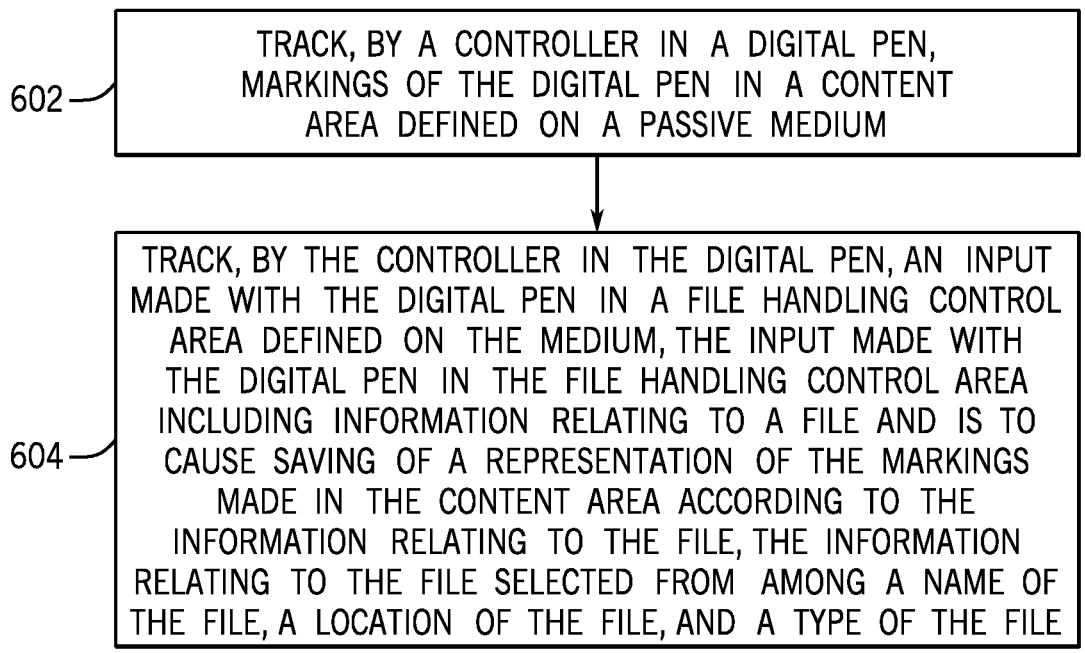
FIG. 6 is a flow diagram of a process to capture markings on a passive medium, according to further examples.

FIG. 6 is a flow diagram of a process according to some examples. The process of FIG. 6 includes tracking (at 602), by a controller in a digital pen (e.g., 104 in FIG. 1A), markings of the digital pen in a content area defined on a passive medium.

The process further includes tracking (at 604), by the controller in the digital pen, an input made with the digital pen in a file handling control area defined on the medium, the input made with the digital pen in the file handling control area including information relating to a file and is to cause saving of a representation of the markings made in the content area according to the information relating to the file, the information relating to the file selected from among a name of the file, a location of the file, and a type of the file.

The storage medium 128 of FIG. 1B or 1C or 500 of FIG. 5 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An apparatus comprising:
a controller to:
track markings of an input element in a content area defined on a medium without electronic input capability;
track an input made with the input element in a file handling control area defined on the medium, the input made with the input element in the file handling control area comprising a file name of a file entered by the input element into a file name entry area of the file handling control area;
save a representation of the markings made in the content area in the file having the file name entered into the file name entry area;
track a further input made with the input element in a layer control area defined on the medium, the further input made in the layer control area selecting a first logical layer of a plurality of logical layers of the medium; and
apply the markings to the first logical layer in response to the further input, wherein the applying of the markings to the first logical layer comprises modifying markings applied previously to a second logical layer of the plurality of logical layers of the medium, wherein the second logical layer is different from the first logical layer.

2. The apparatus of claim 1, wherein the input element comprises a digital pen, and the controller is in the digital pen.

3. The apparatus of claim 1, wherein the input element comprises a digital pen, and the controller is separate from the digital pen and is to receive data corresponding to the tracked markings and the tracked input from the digital pen.

4. The apparatus of claim 1, wherein the input made with the input element further comprises a location of the file.

5. The apparatus of claim 1, wherein the medium comprises a pattern of location information, and the controller is to determine a position of the input element based on capture of location information in the pattern of location information.

6. The apparatus of claim 1, further comprising:
an electronic layer placed over or under the medium, the electronic layer to sense a position of the input element relative to the medium.

7. The apparatus of claim 1, further comprising:
an optical sensor to optically detect a position of the input element relative to the medium.

8. The apparatus of claim 1, wherein the controller is to further:
detect an input element action relative to the first logical layer, wherein the input element action relative to the first logical layer comprises an action indicating deletion of the first logical layer and the markings applied to the first logical layer.

9. The apparatus of claim 8, wherein the controller is to further:
detect a further input element action relative to a further logical layer of the plurality of logical layers; and
track further markings in the content area that are made with respect to the second further logical layer.

10. The apparatus of claim 1, wherein the input made with the input element further comprises a type of the file.

11. The apparatus of claim 1, wherein the controller is to further:
track a further input made with the input element in the file handling control area, the further input comprising information of a location at which the file is to be stored; and
save the file to the location identified by the information of the location.

12. A non-transitory machine-readable storage medium storing instructions that upon execution cause a system to:
receive input information regarding an input made by an input element with respect to a layer control area defined in a physical medium without electronic input capability, the input made with respect to the layer control area selecting a first logical layer of a plurality of logical layers of the physical medium;
receive information of markings made in a content area defined in the physical medium; and
apply the markings to the first logical layer in response to the input information, wherein the applying of the markings to the first logical layer comprises modifying markings applied previously to a second logical layer of the plurality of logical layers of the physical medium, wherein the second logical layer is different from the first logical layer.

13. The non-transitory machine-readable storage medium of claim 12, wherein the instructions upon execution cause the system to further:
- receive additional input information regarding an additional input made with respect to the layer control area, the additional input selecting a further logical layer of the plurality of logical layers;
- receive further information of further markings made in the content area that traces over the markings applied to the first logical layer;
- apply the further markings to the further logical layer in response to the additional input information.

14. The non-transitory machine-readable storage medium of claim 12, wherein the instructions upon execution cause the system to further:
- receive further input information regarding a further input made with respect to the layer control area, the further input indicating deletion of the first logical layer; and
- in response to the further input information, delete the markings applied to the first logical layer.

15. The non-transitory machine-readable storage medium of claim 12, wherein the instructions upon execution cause the system to:
- receive further input information of a further input made by the input element in a file handling control area defined on the physical medium, the further input information comprising a file name of a file entered by the input element into a file name entry area of the file handling control area; and
- save a representation of the markings made in the content area in the file having the file name entered into the file name entry area.

16. A method comprising:
- tracking, by a controller, markings of a digital pen in a content area defined on a passive medium;
- tracking, by the controller, an input made with the digital pen in a file handling control area defined on the passive medium, the input made with the digital pen in the file handling control area comprising a file name of a file entered by the digital pen into a file name entry area of the file handling control area, and the input made with the digital pen in the file handling control area is to cause saving, in the file having the file name entered into the file name entry area, of a representation of the markings made in the content area;
- tracking, by the controller, a further input made with the digital pen in a layer control area defined on the passive medium, the further input made in the layer control area selecting a first logical layer of a plurality of logical layers of the passive medium; and
- applying, by the controller, the markings to the first logical layer in response to the further input, wherein the applying of the markings to the first logical layer comprises modifying markings applied previously to a second logical layer of the plurality of logical layers of the passive medium, wherein the second logical layer is different from the first logical layer.

17. The method of claim 16, further comprising one of:
- saving the representation of the tracked markings and the tracked input in a memory of the digital pen, or
- communicating the representation of the tracked markings and the tracked input to a computer for processing the tracked markings and the tracked input.

18. The method of claim 16, further comprising:
- tracking, by the controller, a further input made with the digital pen in the file handling control area, the further input comprising information of a location at which the file is to be stored; and
- saving, by the controller, the file to the location identified by the information of the location.

* * * * *